United States Patent Office 3,302,642
Patented Feb. 7, 1967

3,302,642
METHOD FOR PROVIDING A PLASTIC
SURGICAL SUPPORT
Robert H. Allen, Midland, Mich., assignor to The Dow
Chemical Company, Midland, Mich., a corporation of
Delaware
No Drawing. Filed Nov. 29, 1963, Ser. No. 327,079
5 Claims. (Cl. 128—90)

This invention relates to a surgical support and, more particularly, to a cast or splint for broken and sprained limbs made from unique, normally crystalline thermoplastic material.

By the term "normally crystalline polymer," as used herein, is meant those solid thermoplastic polymerization products, whether polymers, copolymers, interpolymers, or otherwise named which normally exhibit characteristic X-ray diffraction patterns.

As herein used, the term "normally crystalline vinylidene chloride polymer" includes the polymer of vinylidene chloride alone, its copolymers, and interpolymers which exhibit crystallinity when examined by X-ray diffraction methods or between crossed Nicol prisms and compositions prepared therefrom, by the inclusion of modifying agents, which compositions retain the working characteristics of the crystalline polymers.

"Supercooled" polymer as used herein means normally crystalline polymer which has been substantially completely fused by heating it to a temperature above its crystalline melting point and then cooled or chilled in such a manner as to bring it to a temperature below the crystalline melting point without substantial recrystallization.

The present invention is concerned with the preparation of surgical supports, such as casts or splints for broken and sprained limbs, from normally crystalline polymers, such as the normally crystalline vinylidene chloride polymers, which have been supercooled by chilling the fused materials to form a temporarily non-crystalline, amorphous polymer, which polymer, when heated to normal room temperature, first becomes soft and pliable and easily formed into desired shape, and subsequently becomes crystalline to form a strong rigid material.

Many different methods and materials currently exist for making casts or splints for broken or sprained limbs. Probably, the most commonly used material is plaster of Paris impregnated gauze. In using this material to form a cast or splint, the broken limb is first covered with a sleeve of closely knit, soft, dry fabric; then a roll of wet plaster of Paris impregnated gauze is wrapped around the covered limb. It is then permitted to dry, with or without the application of heat (2 to 24 hours) to form a stiff cast or splint for the injured limb. Such material, after drying, does not permit easy access to the broken or sprained limb unless it is removed. Further, the patient cannot easily or comfortably wash himself or the covered skin surface. Further, casts prepared from plaster of Paris are extremely sensitive to water and will weaken from continued exposure thereto. In addition, casts and splints prepared from plaster of Paris are extremely bulky when high strength is a factor.

In attempting to overcome these undesirable factors, resort has been made to other material, but again other equally undesirable characteristics arise which prevent wholesale adoption of the heretofore suggested alternates. For example, U.S. 2,127,552 suggests the use of solvent-wet celluloid impregnated fabric, while U.S. 2,308,483 suggests the use of a cellulose or vinyl plastic mesh adhered together by the application of a solvent. U.S. 2,483,715 suggests the use of a heated strip of thermoplastic material with solvent to adhere the overlapped strips together. U.S. 2,582,242 recognizes the toxicity and inflammability of the suggested solvents, and suggests the use of a chlorofluoro paraffin, but in admixture with a mutual solvent, such as an alcohol, ester and/or ketone having eight or less carbon atoms. A number of patents, such as U.S. 2,947,307, U.S. 3,027,336 and U.S. 3,089,086 utilize monomers, but the problem of toxicity persists, and is further complicated by the presence of heat during polymerization of the monomer.

It is evident from the above detailed discussion that the medical profession today does not have an optimum material for making casts or splints. It is still seeking a material which is not only flexible during application, and preferably at room temperature, but which also has essentially no toxicity, is non-flammable, will set within a short time, and is washable once applied to the broken or sprained limb.

An object of this invention is to provide a novel surgical support.

Another object is to provide a surgical support which can be applied at room temperature.

Still another object is to provide a surgical support which becomes rigid within a short time after such application at room temperature.

A further object is to provide a surgical support which does not require solvents, heat or other physical or chemical means to cause rigidity.

A still further object is to provide a surgical support which does not evolve heat during its application to the afflicted limb or while it becomes rigid.

Another object is to provide a surgical support which is washable so that the patient may, after its application, freely bathe himself.

Another object is to provide a surgical support which permits visual observation of any open wound beneath the support.

Another object is to provide a surgical support which may be made in net-like fabric form to decrease its weight without deleterious effect upon its strength.

Another object is to provide a surgical support which provides optimum healing conditions for any open wound beneath the support.

Another object is to provide a surgical support which does not cause undesirable body odor by reason of the closed condition of the support over the flesh.

Another object is to provide a surgical support which avoids irritation of the flesh beneath said support.

Other objects of the invention will in part be obvious and will in part appear hereinafter.

The invention, accordingly, comprises the several steps and the relation of one or more of such steps with respect to each of the others, and the article possessing the features, properties, and the relation of elements, which are exemplified in the following detailed disclosure. The scope of the invention will be indicated in the claims.

It has been found that certain crystalline thermoplastic polymeric material, such as the normally crystalline vinylidene chloride polymers, has unique utility as a surgical support. If the material is extruded, preferably as a net-like fabric, and then immediately supercooled to an essentially non-crystalline form, it may then be maintained, for extended periods of time, as a hard, non-crystalline material at temperatures below its second order transition. The second order transition temperature is defined as that temperature at which free rotation of the segments of the polymer chain begins. The second order transition temperature for polyvinylidine chloride has been found to be about $-17°$ C., whereas the second order transition temperature for the normally crystalline copolymers and interpolymers of vinylidene chloride may be somewhat higher, i.e. up to about $0°$ C.

or slightly higher. If such supercooled polymer is permitted to warm to room temperature, it will first become soft and extremely pliable and will eventually crystallize into a rigid plastic. Usually, a fraction of an hour is sufficient to attain such rigidity when the polymer has been warmed to temperatures between about 20° C. and 30° C. Applying this unique characteristic to medical technology, the fabric may be applied to the injured limb while it is soft and rubbery. Since crystallization does not occur immediately, it can be applied at room temperature provided the physician does not permit too much time to elapse before it is properly fitted. Alternatively, it may be applied at a temperature of between 0° to 20° C. to thereby provide conditions which tend to reduce any swelling that may have occurred. Then, after a short period of time at room temperature, the plastic will crystallize into a rigid support. Since no toxic solvents or ususual heat conditions are needed or evolved by reason of internal reaction, a safe method of application is provided. Furthermore, the translucency of most of such polymer materials, when treated in the described manner, thereafter enables constant visual surveillance of any open wound below the surgical support. The inertness of the plastic, especially if used in mesh form, enables continued sterilization of the wound and free and comfortable bathing of the patient and/or the afflicted limb.

Although many techniques may be used to form the preferred net-like polymeric fabric form of this invention, the technique disclosed in British Patents 836,555 and 836,556 is particularly preferred because it is relatively simple and economical. It is to be pointed out, however, that the normally crystalline polymers useful for this invention may also be obtained as supercooled monofilaments, tapes or tubes, and the like, which may be formed, in their essentially amorphous state, to the desired configurations.

To illustrate in detail the making of the preferred net-like polymeric fabric and its use as a surgical support for a broken forearm of a patient in accordance with the objects of this invention, the reader is referred to:

*Example 1*

A three foot wide net-like polymeric fabric having mesh strands and intersections, the whole net being an integral extruded entity, is made of a polymeric mixture of the following composition:

| | Percent |
|---|---|
| A normally crystalline copolymer consisting essentially of from 85 to 90 weight percent vinylidine chloride and complementarily from 15 to 10 weight percent vinyl chloride | 93.75 |
| Acetyltributylcitrate | 4.5 |
| Paraplex G-60 (an ester of an epoxidized fatty acid) | 1.0 |
| t-Butylsalol | 0.75 | using an extruder, as illustrated in British Patent 836,555 (FIG. 10) with one-eighth inch diameter apertures on one-half inch centers. The temperature of extrusion is between 160° to 170° C.

The exudate is caused to lead directly from the lips of the extruder into a bath of cold water maintained at approximately 5° C. and remains there for approximately thirty seconds. It is then caused to emerse and travel to a cutting means where it is cut into lengths of about one foot, and each cut piece rolled onto a spool. The entire spool with wound material thereon is then cooled to a temperature below −10° C.

To prevent the possibility of stick between layers, it is desirable to coat the exudate with mineral oil or other suitable anti-stick agent before winding.

Where an extended period of storage is involved, (two weeks or more), the wound material is stored in a deep freeze at a temperature below −20° to −100° C. Such deep freeze storage insures against any significant crystallization of the material. For example, most normally crystalline vinylidene chloride polymers will crystallize to stiffness in ten to twenty minutes at 30° C., and in several hours at 0° C. However, some crystallization is also noted in normally crystalline vinylidene chloride polymers when stored for extended periods of several weeks at temperatures between about 0° C. and −20° C. Obviously, the lower the temperature, the greater the storability.

The netlike polymeric fabric is used upon the patient's broken limb by first allowing it to warm to room temperature until pliable. Then it is cut to the desired shape, and wrapped about the afflicted portion. The loose ends are held together with clips or stitches or other fastening means.

Within ten to twenty minutes at room temperature the polymeric fabric will crystallize and stiffen. The stiffness is sufficient to provide adequate support to the afflicted limb until the fracture sets.

During healing, the patient may freely bathe himself or the injured arm. There is no odor because body waste cannot accumulate between the skin and the plastic cast. The open mesh structure permits free circulation of air so that there is no irritation to the skin. In addition, the translucent nature of the normally crystalline vinylidene chloride polymer treated as described herein, and the open structure of the polymeric fabric employed, permit the physician to continually observe any wound beneath the surface of the support. If medication is required, fluid application through the mesh can be used. All in all, a very easily applied, long lasting, comfortable surgical support is provided.

Similar good results are obtained using any of the normally crystalline vinylidene chloride polymers as defined herein, or any other normally crystalline polymeric material capable of meeting the requirements of the present invention.

What is claimed is:

1. A method for providing support to broken and sprained limbs comprising:
   (1) applying a normally crystalline polymeric material while in a flexible, essentially amorphous state to said limbs, said polymeric material being maintained at a temperature tolerable to human flesh, and
   (2) allowing said normally crystalline polymeric material to crystallize at ordinary room temperature to form a rigid support for said limbs.

2. The method of claim 1, wherein said normally crystalline polymeric material is a normally crystalline vinylidene chloride polymer.

3. The method of claim 2, wherein said normally crystalline vinylidene chloride polymer is extruded in an essentially amorphous form and the extrudate immediately supercooled to maintain such amorphous form, prior to use as a support for broken and sprained limbs.

4. The method of claim 3, wherein said supercooled, essentially amorphous extrudate is warmed to a temperature between about 0° C. and 30° C. and subsequently wrapped about said limb while still flexible in a manner to provide rigid support to said limb when said web crystallizes.

5. The method of claim 4, wherein said extrudate is in the form of a net-like fabric having mesh strands and intersections, the whole net being an integral extruded entity.

References Cited by the Examiner

UNITED STATES PATENTS 2,183,602   12/1939   Wiley.
2,320,112   5/1943    Wiley.

FOREIGN PATENTS 836,555   6/1960   Great Britain.

RICHARD A. GAUDET, *Primary Examiner.*

J. W. HINEY, JR., *Assistant Examiner.*